United States Patent
Ewerhart et al.

(10) Patent No.: US 8,386,124 B2
(45) Date of Patent: Feb. 26, 2013

(54) METHOD AND DEVICE FOR STABILIZING A VEHICLE AFTER A COLLISION

(75) Inventors: Frank Ewerhart, Weinsberg (DE); Reiner Marchthaler, Gingen (DE); Mario Kroeninger, Buehl (DE); Stephan Stabrey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 871 days.

(21) Appl. No.: 11/887,437

(22) PCT Filed: Feb. 15, 2006

(86) PCT No.: PCT/EP2006/050949
§ 371 (c)(1), (2), (4) Date: Sep. 21, 2009

(87) PCT Pub. No.: WO2006/106009
PCT Pub. Date: Oct. 12, 2006

(65) Prior Publication Data
US 2010/0004815 A1  Jan. 7, 2010

(30) Foreign Application Priority Data
Apr. 7, 2005 (DE) .......... 10 2005 016 009

(51) Int. Cl.
*B60W 30/02* (2006.01)
*B60Q 1/34* (2006.01)

(52) U.S. Cl. .......... 701/33.4; 340/438; 340/463

(58) Field of Classification Search .......... 701/36, 701/37–41, 300–302, 33.4; 340/438, 425.5, 340/463
See application file for complete search history.

(56) References Cited

U.S. PATENT DOCUMENTS

| | | | |
|---|---|---|---|
| 6,267,194 B1 | 7/2001 | Bullinger et al. | |
| 6,657,539 B2 * | 12/2003 | Yamamoto et al. | 340/438 |
| 2011/0054741 A1 * | 3/2011 | Stabrey | 701/43 |

FOREIGN PATENT DOCUMENTS

| | | |
|---|---|---|
| CN | 1358645 | 7/2002 |
| DE | 101 31 198 | 1/2003 |
| EP | 1 215 097 A | 6/2002 |
| JP | 9-136659 | 5/1997 |
| JP | 11-227624 | 8/1999 |
| JP | 2000-158973 | 6/2000 |
| JP | 2000-219111 | 8/2000 |
| JP | 2003-81074 | 3/2003 |
| JP | 2000-142360 | 5/2003 |

* cited by examiner

*Primary Examiner* — Yonel Beaulieu
(74) *Attorney, Agent, or Firm* — Kenyon & Kenyon LLP

(57) ABSTRACT

A device for stabilizing a vehicle after a collision, including a control device having a regulation algorithm, a sensor system for recording various quantities that describe the vehicle state, and an actuator for carrying out a stabilization intervention. The driving state of the vehicle is monitored for the occurrence of a collision, a setpoint value is calculated for a vehicle movement quantity, the setpoint value being at least partly independent of the steering instruction of the driver, and the vehicle movement quantity of the vehicle is regulated to this setpoint value in the case of a collision.

15 Claims, 2 Drawing Sheets

METHOD AND DEVICE FOR STABILIZING A VEHICLE AFTER A COLLISION

FIELD OF THE INVENTION

The present invention relates to a device for stabilizing a vehicle after a collision, as well as to a corresponding method.

BACKGROUND INFORMATION

Vehicle stabilization systems, such as e.g. ESP, generally regulate the yaw rate and/or float angle of the vehicle. When these regulated quantities deviate too greatly from their setpoint values, the regulation system intervenes in the vehicle's movement in order to stabilize the vehicle through automatic, wheel-individual braking interventions, or using an active steering system. The goal of the regulation is to adapt the actual movement of the vehicle to a setpoint vehicle movement determined by the angle of the steering wheel. In addition, in the determination of the braking interventions the goal is pursued of slowing down the vehicle as little as possible, because this can be perceived as disturbing by the driver.

Vehicle dynamics regulation systems support the driver in the boundary area of the vehicle's dynamics, when the vehicle oversteers or understeers due to the limitation of the maximum lateral forces that are able to be transmitted by the wheels. However, in the case of a collision the known systems run up against their limits. Here, rear-end collisions or offset side collisions, in which a large yaw moment is exerted on the vehicle and the vehicle is quickly set into rotation, are particularly critical. Differing from frontal collisions, here the vehicle speed is not necessary reduced, so that in some circumstances the vehicle continues to move at a high speed. Since in particular inexperienced drivers often react wrongly or too late to the collision, and initiate unsuitable countermeasures, such as e.g. excessive countersteering, too-weak braking, etc., in some circumstances the vehicle will go completely out of control, resulting in accidents that can have grave consequences due to the high speed.

Conventional vehicle dynamics regulation systems do indeed intervene in driving operation in such a situation, but however are not able to stabilize the vehicle quickly enough and in an optimal manner, because the steering angle determined by the driver—which may have arisen in the confusion of the collision and may be unsuitable for achieving stabilization—is used as a basis for the regulation of the yaw rate or float angle. This has the result that the controller is following a non-optimal setpoint setting.

An object of the exemplary embodiments and/or the exemplary methods of the present invention is therefore to create a device and a method for stabilizing a vehicle, with the aid of which the vehicle is effectively stabilized after a collision, and is simultaneously significantly slowed down in order to reduce the danger and severity of potential resulting accidents.

According to the exemplary embodiments and/or the exemplary methods of the present invention, this object is achieved by the features described herein. Additional constructions of the exemplary embodiments and/or the exemplary methods of the present invention are the subject matter as described herein.

An idea of the exemplary embodiments and/or the exemplary methods of the present invention is to use sensors to monitor the driving state of the vehicle for the occurrence of a collision, and in the case of a recognized collision to regulate a quantity that describes the vehicle movement (vehicle movement quantity), such as e.g. the yaw rate, the float angle, or the lateral acceleration of the vehicle, to a setpoint value that is at least partially independent of the driver's steering input. This has the essential advantage that in the case of a collision it is possible to reduce the effects that a panicked reaction of the driver has on the regulation. The vehicle can thus be stabilized in a significantly more effective and faster manner.

The setpoint value of the regulation can be determined in various ways. According to a first exemplary embodiment of the present invention, as a setpoint value an actual value measured immediately before the collision is used, such as for example the actual yaw rate present immediately before the collision. If at the time of the collision the vehicle is moving through a curve, the vehicle movement is also regulated according to this curve after the collision.

According to an exemplary embodiment of the present invention, a setpoint yaw rate is calculated from a yaw rate calculated on the basis of the current driver steering angle, and on the basis of the yaw rate measured immediately before the collision.

According to another exemplary embodiment of the present invention, a driving lane recognition system is provided that records the surrounding environment of the vehicle, e.g. using a video camera, and extracts from the image data information concerning the course of the driving lane. In this case, the calculation of the setpoint value takes place on the basis of the information concerning the course of the driving lane.

Optionally, a system can also be provided with which the trajectories (movement paths) of other vehicles are determined, e.g. using the radar sensor of an ACC system. In this case, the setpoint value can be calculated on the basis of the trajectories of the other vehicles. In this way, it is achieved that the vehicle suffering the accident is aligned with the movement paths of other vehicles.

According to another exemplary embodiment of the present invention, the setpoint value is calculated from the data of a vehicle navigation system. If the lane course and the current position of the vehicle are known from a digital map, for example a setpoint yaw rate can be determined that the vehicle must have in order to follow the course of the lane.

According to another variant of the present invention, after the collision the vehicle is oriented by regulation interventions in such a way that the lateral speed of the vehicle is reduced in its magnitude. In this way, the severity of a potential side collision, which would be particularly dangerous for the vehicle's occupants, is reduced.

In the case of a collision, the vehicle may be not only stabilized but also actively braked. The vehicle's longitudinal speed can here be reduced to a predetermined value, or the vehicle can be brought to a stop.

The yaw rates measured in a collision can greatly exceed the yaw rates that occur during normal vehicle operation. Known vehicle dynamics regulating systems standardly carry out a plausibility test of the sensor signals in order to recognize errored sensor signals and to avoid false reactions of the system. Here, high yaw rates, or rapid changes in yaw rates, are standardly ignored and are regarded as error signals. In order to avoid this in the case of a collision, it is proposed to expand the plausibility range for the signal of the yaw rate sensor in the case of a collision, and thus also to regard very high yaw rates or changes in yaw rates as plausible.

In principle, a collision can be recognized by any suitable sensor mechanism, such as for example pressure sensors or acceleration sensors integrated at a suitable location in the vehicle. The design of the sensors and the location at which they are attached are sufficiently known from the prior art.

According to an exemplary embodiment of the present invention, the sensors of an airbag system are used to recognize a collision event. This can be realized in a particularly economical manner, because no additional sensors are required.

Given situation of a plurality of impact sensors in the vehicle, in particular the location of the impact, and possibly also the angle of the object collided with relative to the home vehicle, can be determined more precisely. From this, information can be derived concerning the magnitude of the forced yaw movement of the home vehicle. According to the exemplary embodiments and/or the exemplary methods of the present invention, these values can in turn be used to verify the yaw rates measured by the yaw rate sensor. In this way, the strength of the required regulating intervention can be determined more precisely and more reliably.

In the following, the exemplary embodiments and/or the exemplary methods of the present invention is explained in more detail on the basis of the accompanying drawings.

DETAILED DESCRIPTION

Figure 1:
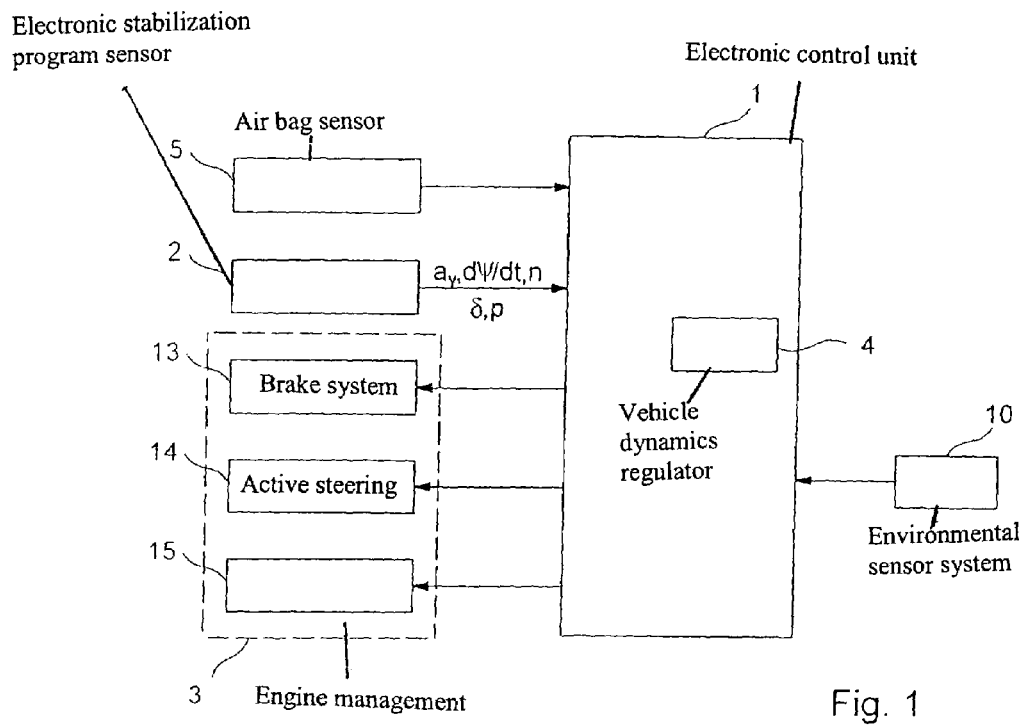
FIG. 1 shows a schematic representation of a vehicle dynamics regulation system that additionally makes use of signals from airbag sensors.

FIG. 1 shows a schematic representation of a stabilization system 1-5 that is designed to brake the vehicle at least partly after a collision, and in particular to reduce the yaw movement caused by the collision.

Stabilization system 1-5 has a sensor system 2 for recording various vehicle state quantities from which the actual behavior of the vehicle is determined. Sensor system 2 has in particular a lateral acceleration sensor, a yaw rate sensor, a brake pressure sensor, wheel rotational speed sensors, and a steering wheel angular sensor. All the sensors of the system are combined in block 2. In the case of a vehicle having a vehicle dynamics regulation system (e.g. ESP), the sensors of the vehicle dynamics regulation system can be used.

In addition, stabilization system 1-5 has a control device 1 in which a regulation algorithm 4 (FDR) is stored, as well as a plurality of actuators 3 with which the stabilization system can intervene in driving operation. In the present exemplary embodiment, it is possible to intervene in the driving operation using the braking system (13), an active steering system (14), and/or by influencing the controlling of the engine (15), in order to stabilize or slow down the vehicle.

Figure 2:
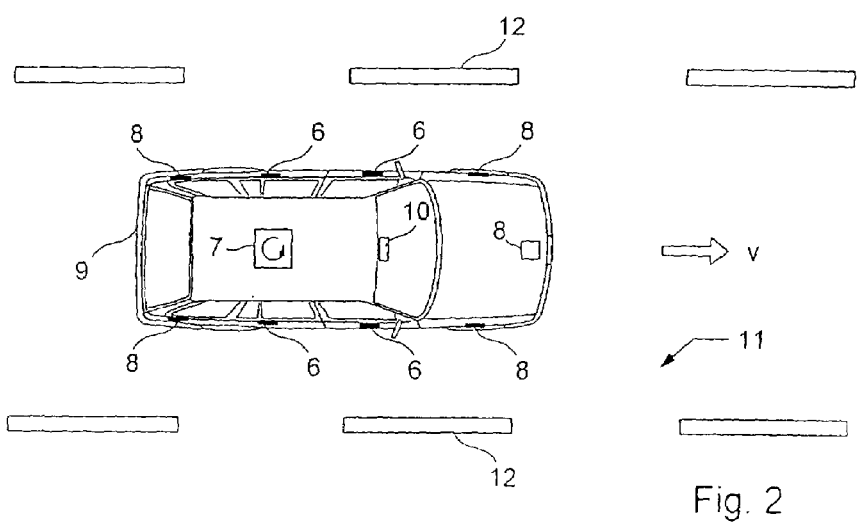
FIG. 2 shows a representation of a vehicle in its driving lane.

For collision recognition, a sensor mechanism 5 is provided that is connected to control device 4 and that has a plurality of pressure sensors and/or acceleration sensors 6 or 8 (see FIG. 2). In vehicles having an airbag system, the already-existing sensor system of the airbag system can be used.

Reference character 10 designates an environmental sensor system, such as e.g. a driving lane recognition system that provides data about the course of the roadway. These data can be used to calculate a setpoint value, such as e.g. a setpoint yaw rate $d\psi_{setpoint}/dt$, for the control intervention. All the above-named components are in communicative connection with control device 1.

Environmental sensor system 10 can alternatively be a radar system known from ACC systems, with which the vehicles traveling in front of the home vehicle can be recognized. From these data, the trajectories of the vehicles can be reconstructed and can be used for the calculation of the setpoint value for the regulation.

Another possibility is to carry out the regulation on the basis of data from a vehicle navigation system. For this purpose, for example the data from a digital map can be used.

In the case of a collision, in the confusion of the moment the driver often reacts wrongly, for example by turning the steering wheel too far or not far enough. Controller 4 is therefore designed so that the steering input provided by the driver—which may have originated in the confusion of the collision—is not taken into account, or is taken into account only partially. In the case of a collision, controller 4 switches into a second mode and then calculates a setpoint quantity, such as e.g. a setpoint yaw rate $d\psi_{setpoint}/dt$, which is at least partly independent of the steering input provided by the driver, and controls the regulated quantity (e.g. the yaw rate) of the vehicle to this setpoint value. Optionally, the vehicle's lateral acceleration $a_y$ or float angle $\beta$ can be regulated. A more precise explanation of the regulation strategy is given below on the basis of FIG. 3.

FIG. 2 shows a vehicle 9 that is moving in its lane 11 in the direction of the arrow with speed v. Vehicle 9 has an airbag system having a plurality of pressure sensors 6 that are situated in the area of the door of the vehicle 9, and has a plurality of acceleration sensors 8 that are integrated laterally at the front and at the rear and in the engine compartment. The sensor signals of sensors 6, 8 are permanently monitored during driving operation in order to recognize a collision.

Figure 3:
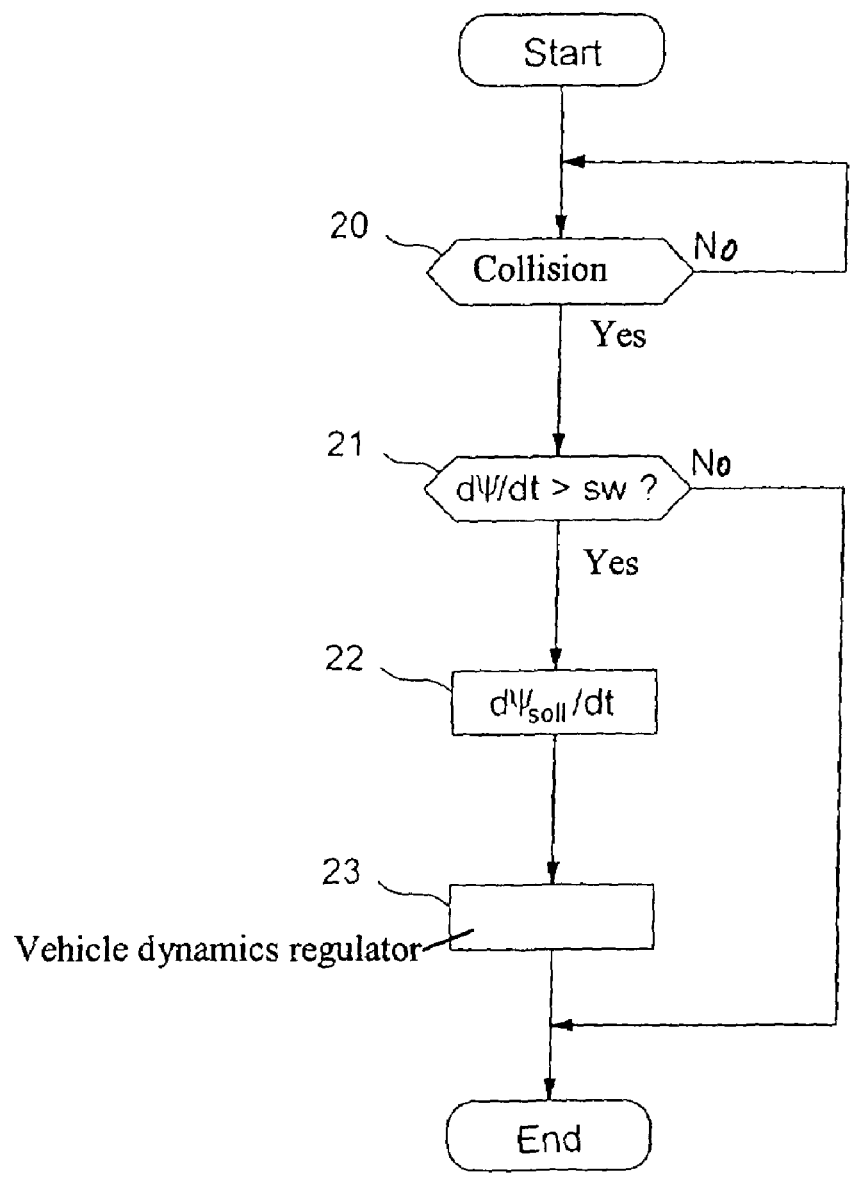
FIG. 3 shows a flow diagram for the representation of the essential method steps for stabilizing a vehicle after a collision.

FIG. 3 shows the essential method steps of a method for stabilizing a vehicle after a collision, a yaw rate controlling being carried out. In step 20, first the sensor signals of sensors 6, 8 are evaluated. In the case of a collision (J), it is also checked whether the vehicle has been set into rotation by the collision. For this purpose, in step 21 it is queried whether the yaw rate $d\psi/dt$, or the change in the yaw rate, exceeds a predetermined threshold value SW.

In the present example, the yaw rate $d\psi/dt$ is measured by a yaw rate sensor 7 (FIG. 2) of the ESP sensor system 2. The signal from yaw rate sensor 7 can be verified by evaluating sensors 6, 8.

When yaw rate $d\psi/dt$, or the change in this rate, exceeds threshold value SW (case J), in step 22 a setpoint value that is independent of the current steering wheel angle is selected. In the present example, the yaw rate occurring immediately before the collision is used. Optionally, the setpoint value could also be calculated from the data from environmental sensor system 10.

In step 23, stabilization algorithm 4 finally intervenes in the driving operation and produces a yaw moment that counteracts the yaw movement caused by the collision. For this purpose, driving dynamics regulator 4 makes use of the wheel brakes of braking system 13 and/or uses a steering actuator of the active steering system 14 and/or of engine management system 15.

In addition, FDR algorithm 4 is designed in such a way that vehicle 9 is braked in the longitudinal direction. Vehicle 9 can be partially or completely braked. In this way, it is possible to effectively stabilize the vehicle and to reduce the danger of a subsequent accident, as well as the severity thereof.

The List of reference characters is as follows:
1 control device
2 ESP sensor system
3 actuators 4 vehicle dynamics regulator
5 airbag sensors
6 pressure sensors
7 yaw rate sensor
8 acceleration sensors
9 vehicle
10 environmental sensor system
11 driving lane
12 driving lane boundary strips
13 brake system
14 active steering
15 engine management
20-23 method steps
$a_y$ lateral acceleration
$d\psi/dt$ yaw rate
n wheel rotational speed
$d\psi_{setpoint}/dt$ setpoint yaw rate
$\delta$ steering angle
p brake pressure

What is claimed is:

1. A device for stabilizing a vehicle after a collision, comprising:
    a control device having a regulation algorithm;
    a sensor system for recording various quantities of a movement of the vehicle; and
    a collision sensor system for recognizing the collision, and for a collision, the regulation algorithm uses a setpoint value for a vehicle movement quantity that accounts for a driver's steering input generated a predetermined period of time prior to the collision; and regulates the movement of the vehicle to this setpoint value.

2. The device of claim 1, wherein an actuator is used in providing a stabilization intervention.

3. The device of claim 1, wherein the setpoint value for the regulated vehicle movement quantity is completely independent of the steering wheel angle provided by the driver.

4. The device of claim 1, wherein the setpoint value for the regulated vehicle movement quantity is determined based on data from an environmental sensor system.

5. The device of claim 1, wherein an actual value of the vehicle movement quantity that is present immediately before the collision is used as the setpoint value.

6. The device of claim 1, wherein after a recognition of collision, an automatic braking intervention is carried out to significantly reduce a longitudinal speed of the vehicle.

7. The device of claim 1, wherein the control device is able to access at least one of a braking system, an active steering system, and an engine controlling system as an actuator for the regulation.

8. A method for stabilizing a vehicle after a collision, the method comprising:
    monitoring, using a sensor system, a driving state of the vehicle for an occurrence of a collision;
    determining a setpoint value for a vehicle movement quantity that accounts for a driver's steering input generated a predetermined period of time prior to the collision; and
    regulating, for a collision, the vehicle movement to the setpoint value through stabilization interventions.

9. The method of claim 8, wherein a setpoint value for a vehicle movement quantity is used that is independent of a steering input from the driver.

10. The method of claim 8, wherein the setpoint value of the regulated vehicle movement quantity is determined based on data from an environmental sensor system.

11. The method of claim 8, wherein the setpoint value of the regulated vehicle movement quantity is determined based on a position, determined with a GPS system, and based on a digital map.

12. The method of claim 8, wherein after a recognition of a collision, an automatic braking intervention is carried out to significantly reduce a longitudinal speed of the vehicle.

13. The method of claim 8, wherein the regulated vehicle movement quantity includes one of a yaw rate, a lateral speed, and a float angle.

14. The device of claim 1, wherein the setpoint value for a vehicle movement quantity is independent of a steering input of a driver provided after the collision.

15. The method of claim 8, wherein the setpoint value for a vehicle movement quantity is independent of a steering input of a driver provided after the collision.

* * * * *

UNITED STATES PATENT AND TRADEMARK OFFICE
CERTIFICATE OF CORRECTION

PATENT NO. : 8,386,124 B2  Page 1 of 1
APPLICATION NO. : 11/887437
DATED : February 26, 2013
INVENTOR(S) : Ewerhart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1541 days.

Signed and Sealed this

First Day of September, 2015

Michelle K. Lee
*Director of the United States Patent and Trademark Office*